United States Patent [19]

Gessler

[11] 4,412,976
[45] Nov. 1, 1983

[54] ADJUSTABLE WHEEL ASSEMBLY IN A ROTARY SOLVENT EXTRACTOR

[75] Inventor: Donald A. Gessler, Verona, Pa.

[73] Assignee: Dravo Corporation, Pittsburgh, Pa.

[21] Appl. No.: 300,380

[22] Filed: Sep. 8, 1981

[51] Int. Cl.³ ............................................... B01D 11/02
[52] U.S. Cl. ...................................... 422/270; 280/43; 301/122; 422/269
[58] Field of Search ............................... 422/268–270; 301/114, 117, 122, 124 H, 126, 128; 74/840, 841; 308/237 A; 64/1 S, 3, 4; 127/25; 280/43

[56] References Cited

U.S. PATENT DOCUMENTS

| | | | |
|---|---|---|---|
| 350,323 | 10/1886 | Schuchardt | 280/43 X |
| 658,675 | 9/1900 | Reed | 301/114 |
| 1,188,337 | 6/1916 | Siebert et al. | 301/122 |
| 1,259,962 | 3/1918 | Cormack | 280/43 |
| 2,715,033 | 8/1955 | Fogarty et al. | 280/43 X |
| 2,736,567 | 2/1956 | McMurray | 280/43 X |
| 2,840,459 | 6/1958 | Karnofsky | 422/268 X |
| 2,955,835 | 10/1960 | Chouinard | 280/43 |
| 4,125,379 | 11/1978 | Saxon | 422/269 |
| 4,211,752 | 7/1980 | Saxon | 422/268 |

Primary Examiner—Richard L. Chiesa
Attorney, Agent, or Firm—Louis E. Marn; E. M. Olstein

[57] ABSTRACT

There is disclosed an improved wheel housing assembly comprised of a wheel, a wheel axle and an axle housing wherein the wheel axle is formed of wheel and housing shaft portions with the axis of the wheel shaft portion being parallel to and slightly displaced or offset from the axis of the housing shaft portion whereby rotation of the housing shaft portion within a housing member permits the wheel shaft portion to be rotated about the axis of the housing shaft portion thereby to permit elevational adjustment of the wheel of the wheel assembly with respect to the horizontal.

6 Claims, 4 Drawing Figures

ADJUSTABLE WHEEL ASSEMBLY IN A ROTARY SOLVENT EXTRACTOR

FIELD OF THE INVENTION

This invention relates to a wheel assembly, and more particularly to an improved wheel assembly to permit adjustment of a wheel of a cell door to a track of a rotary extractor assembly.

BACKGROUND OF THE INVENTION

In U.S. Pat. No. 2,840,459, assigned to the same assignee as the present invention, there is disclosed a process and apparatus for the continuous extraction of oils and/or soluble materials from particulate materials, and comprised of a large vessel forming a vapor-type enclosure in which there is disposed a rotor assembly including a plurality of cells formed by radially-disposed walls extending toward and mounted to peripherally-disposed end walls. A plurality of fluid manifold assemblies radially-disposed above the cells in a preselect manner permit the introduction of miscella and solvent streams into the cells, generally to effect counter-current extraction utilizing percolation techniques. The bottom of each cell is provided with a hinged cell door assembly including a wheel assembly including a wheel member for coursing a track mounted within the lower portion of the vessel for opening and closing the cells. Drainage compartments generally include the rotor assembly for collecting miscella.

In U.S. Pat. No. 4,125,379, and also assigned to the assignee of the present invention, there is disclosed a rotary extractor assembly including a rotor assembly having upper and lower wheel assemblies positioned along the periphery thereof for coursing on upper and lower track assemblies mounted within the vessel. Each cell door is provided with a lower wheel assembly mounted to support the door during coursing of the wheel assembly in the lower track. The bottom inside wall of each cell encompasses the outer periphery of the cell door with a critical minimum gap where the cell door protrudes into the cell at a proper elevation required for mechanical and process functioning of the rotary extractor assembly. Generally, in order to achieve proper elevation of each cell door during assembly, shims are inserted between the axle of cell door wheel and the bottom of the cell door for all cell doors, a tedious and time consuming procedure.

During operation of the rotary extractor, such shims have caused to become loosened and thereby dislodged causing damage to the rotary extractor assembly as well as production losses due to extended down times.

OBJECTS OF THE INVENTION

It is an object of the present invention to provide a novel wheel assembly.

Another object of the present invention is to provide a novel wheel assembly for a rotary extractor assembly.

A still further object of the present invention is to provide a novel wheel assembly for a rotary extractor assembly whereby minimal time is required for initial mechanical adjustment.

Still another object of the present invention is to provide a novel wheel assembly for a rotary extractor assembly permitting of permanent cell door elevational adjustment for proper mechanical and process requirements.

Yet another object of the present invention is to provide a novel wheel assembly for a rotary extractor assembly substantially eliminating rotary extractor assembly down time caused by disorientation of wheel adjustment of the wheel assemblies therefor.

SUMMARY OF THE INVENTION

These and other objects of the present invention are obtained by an improved wheel assembly comprised of a wheel, a wheel axle and an axle housing wherein the wheel axle is formed of wheel and housing shaft portions with the axis of the wheel shaft portion being parallel to and slightly displaced or offset from the axis of the housing shaft portion whereby rotation of the housing shaft portion within a housing member permits the wheel shaft portion to be rotated about the axis of the housing shaft portion thereby to permit elevational adjustment of the wheel of the wheel assembly with respect to the horizontal.

BRIEF DESCRIPTION OF THE DRAWING

A better understanding of the present invention as well as other objects and advantages thereof, will become apparent upon consideration of the detailed disclosure thereof, especially when taken with the accompanied drawing, wherein.

DETAILED DESCRIPTION OF THE INVENTION

Figure 1:
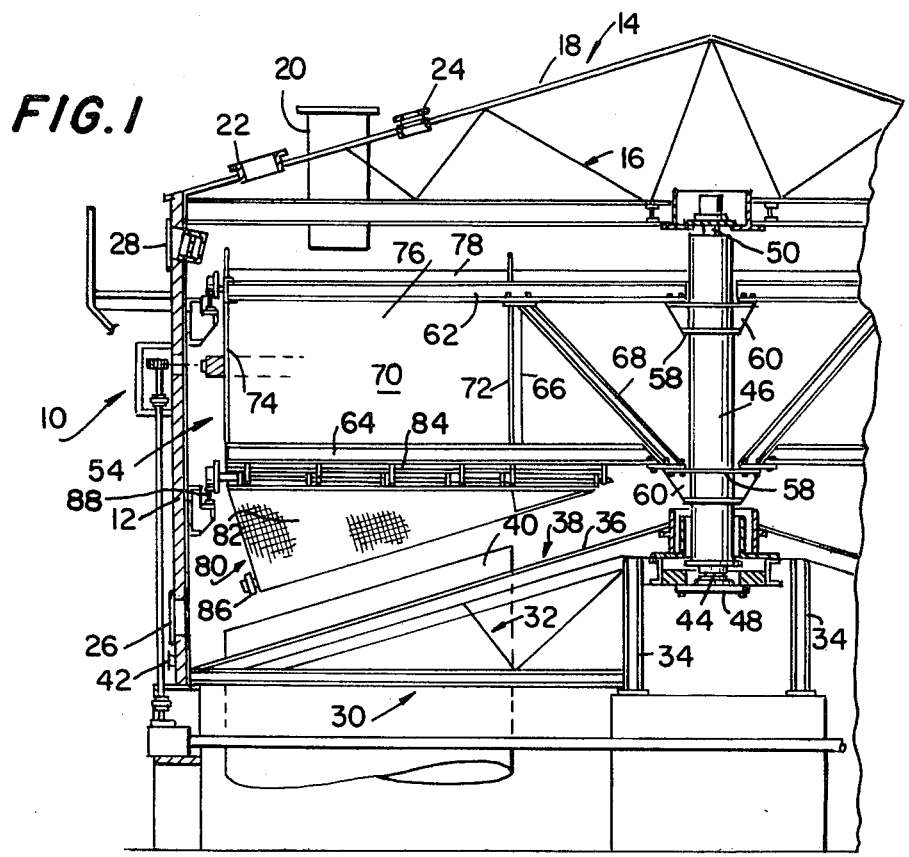
FIG. 1 is a partial cross-sectional view of a rotary extractor assembly.

Referring to the drawing, there is illustrated a rotary extractor assembly, generally indicated as 10, comprised of a cylindrical casing or vessel 12, positioned on a suitable foundation and having a truss roof mounted thereon, generally indicated as 14, and which is comprised of a plurality of radially-extended roof truss members (one shown), generally indicated as 16, on which are mounted plate members 18. Roof 14 is provided with a feed chute 20, a manhole accessways 22 (one shown) and visual access assemblies 24 (one shown). The vessel 12 is similarly provided with manhole accessways 26 (one shown) and visual access assemblies 28 (one shown), all positioned for access and visual inspection of the extractor 10.

The bottom of the rotary extractor assembly 10, generally indicated as 30, is comprised of a plurality of radially-extending cone truss members, generally indicated as 32, mounted to a rotor bearing support 34, positioned on a suitable foundation. On the cone truss members 32, there are mounted cone plate members 36 forming a generally conically-shaped sloping bottom wall, generally indicated as 38. Mounted to the cone plate members 36 are vertically-standing plates 40 (one shown) positioned therearound to form a plurality of solvent collection cells having outlets 42 (one shown), such as disclosed in the hereinabove mentioned U.S. Pat. No. 2,840,459. To prevent solvent losses, the extractor 10 including the vessel 12, roof 14 and bottom 30 is generally sealed to enable the rotary extractor assembly 10 to be operated at below or above atmospheric pressure.

A lower guide shaft 44 is vertically mounted to a rotor shaft 46 and is journalled for rotation in a combination of a truss bearing and radially bearing 48 positioned within the motor bearing support 34. An upper guide shaft 50 is vertically mounted to the rotor shaft 46 for alignment with the radially-extended roof truss 16. Suitable lubrication and conventional vapor seals (not shown) are provided for guide shaft 44 and for the envelope of the extractor assembly 10.

The rotor shaft 46 supportably forms part of a rotor assembly in the form of a spool frame, generally indicated as 54. Upper and lower ring flanges 56 and 58, respectively, are welded to rotor shaft 46. The spool frame 54 is comprised of circumferentially and radially-disposed cell support beams 62 and cell door support beams 64 fastened to upper and lower ring flanges 56 are 58, respectively.

Vertically-disposed struts 66 are positioned intermediate the cell support beams 62 and the cell door support beams 64 with radially-extending struts 68 mounted at one end to the ring flange 58 and at the other end to the cells support beams 62 proximate to the juncture of the struts 66 to the cell support beams 62. The beams and the struts are either welded or bolted together in rigid structure to form the spool frame 54 which provides support for the cells, generally indicated as 70, of the extractor assembly 10, adapted to contain solid material to be contacted by an extraction solvent, as is known to one skilled in the art.

The cell 70 is opened at the top and is substantially sector-like in plan and is comprised of vertically-disposed inner and outer walls 72 and 74 and radially and vertically-disposed side walls 76. The side walls 76 are substantially vertical and inclined angularly inwardly towards the bottom of the respective cells to minimize tendency of solids to cling thereto. A gabled cap 78 is fixedly-positioned on the top of paired side walls 76 mounted to like cell support beam 62 to assist in the abrupt transfer of liquid from a preceding cell to an immediately succeeding cell as well as to prevent material from falling between adjoining side walls 76.

The bottom of each cell 70 is trapozoidly-shaped and is closed by a hingedly-attached cell door assembly generally indicated as 80, including mesh screen 82 of a preselect size for the material undergoing treatment. A hinge pin 84 is provided for each door assembly positioned about an edge adjacent the bottom of each cell to enable the door assembly to swing about the hinge from the lower leading edge thereof. Journalled in a housing leading edge of the respective ends of the door assemblies 80 is a wheel member 86 supportably engaged on a cell wheel track 88 to the inner wall of the vessel or for that portion of rotation of the cells 70 in which the door assemblies 80 are maintained in a substantially-closed position.

Figure 2:
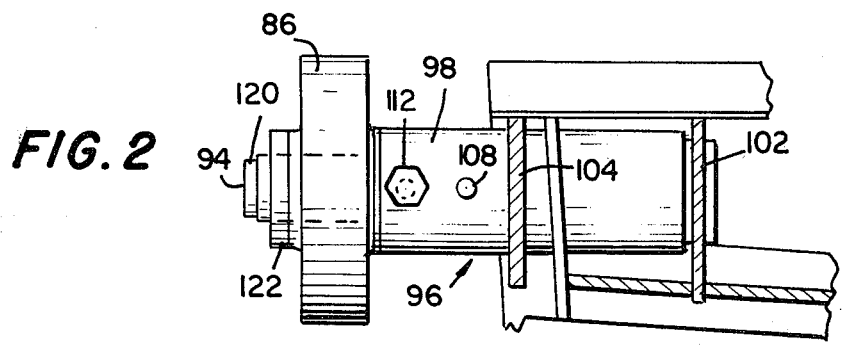
FIG. 2 is an enlarged partial elevational and cross-sectional view of the adjustable wheel assembly of the present invention.
Figure 4:
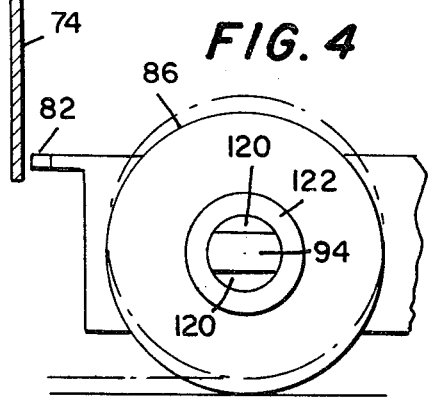
FIG. 4 is a side view of FIG. 3.
Figure 3:
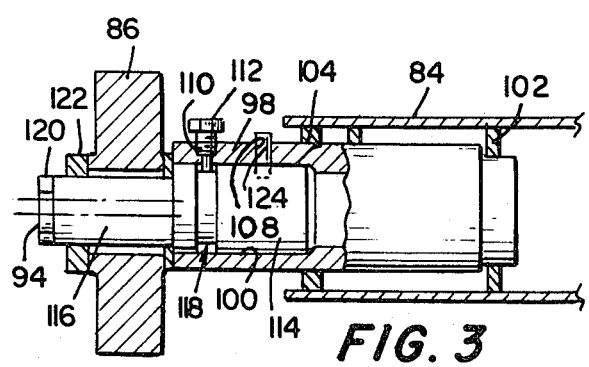
FIG. 3 is a top view of the adjustable wheel assembly of FIG. 2.

Referring now to FIGS. 2 to 4, there is illustrated an improved wheel assembly, generally indicated as 90, of the present invention comprised of the wheel member 86, a wheel axle 94 and an axle housing member, generally indicated as 96. The axle housing member 96 is comprised of a machined tube 98 having a cylindrically-shaped chamber 100 and mounted to inner and outer plate members 102 and 104, respectively, mounted to a lower portion of the leading edge of the cell door assembly 80, with the chamber portion thereof extending generally outwardly from support plate member 104. Peripherally-formed about the axle housing member 96 centrally of the chamber 100, there is provided an orifice 108 and a threaded orifice 110 for receiving a threaded bolt 112, and as more fully hereinafter described.

The wheel axle 94 is comprised of a housing shaft portion 114 and a wheel shaft portion 116 including an annular groove 118 and outer flat surfaces 120. The axis of the wheel shaft portion 116 is parallel and offset to the axis of the housing shaft portion 114, and for the instant invention, such offset being about ½ inch. Preferably, the wheel axle 94 is formed of a unitary construction with the housing shaft portion 114 and the wheel shaft portion 116 being machined into steps.

The housing shaft portion 114 of the wheel axle 94 is positioned within the chamber 100 of the axle housing member 96 with the threaded bolt 112 inserted into the threaded orifice 110 to a point at which a top portion is inserted into the annular groove 118. The wheel member 86 including a bearing 122 is positioned about the wheel shaft portion 116 of the wheel axle 94, and held in place by a retaining ring 122.

To adjust the wheel 86 with reference to the cell wheel track 88, the wheel axle 94 is caused by clasping the surfaces 122 thereof to be rotated in either a clockwise or counter clockwise direction until the wheel 86 is properly elevationally-disposed on the track 88, at which point the bolts 110 are caused to be further inwardly-threaded to fixedly position the housing shaft portion 114 within the chamber 100 of the axle housing member 96. It will be understood with a one-half inch offset, that an adjustment level of wheel elevation may be effected of from 0 to 1 inch.

With the cell door hinge assembly and the cell door elevation fix, the adjustments as hereinabove described, permits proper elevation of cell door protrusion into the cell. Once a desired elevation is obtained, an orifice is drilled in the housing shaft portion 114 through the orifice 108 of the axle housing member 98 for disposing a shear pin 124 therein, thereby permanently fixing the elevation of the wheel 86 with respect to the track 88 thereby eliminating any further elevational adjustment of the wheel 86 to the cell track 88.

While the wheel assembly of the present invention has been described with reference to a rotary extractor assembly, it will be understood that the wheel assembly may be used in rotary or linear assemblies wherein a plurality of wheels are utilized to support a load and wherein the respective elevation of the wheels to the supporting track member are of concern for continued trouble-free operation.

While the invention has been described in connection with a preferred embodiment thereof, it will be understood that many modification will be apparent to those of ordinary skill in the art; and that this application is intended to cover any adaptation or variation thereof. Therefore, it is manifestly intended that this invention be only limited by the claims and the equivalents thereof.

What is claimed:

1. In a rotary solvent extractor including a vessel in which there is disposed a plurality of cells formed by a plurality of radially-extending side walls arranged in circumferential fashion on a generally horizontal plane around a vertically-disposed rotor, a feed conduit for introducing solids to be treated into said cells, a solid-retaining cell bottom closure including a wheel member for each cell of said cells, a track mounted to said vessel proximate said side walls of said plurality of cells on which track said wheel member rides to maintain said bottom closure in substantially closed position during a predetermined portion of a rotational path of each cell, conduits for successively introducing solvent into said cells from above said predetermined portion of said rotational path, a liquid collection zone disposed beneath said cells and including a plurality of compartments for receiving miscellas, an improved wheel housing assembly to permit elevational adjustment of said wheel with respect to said track, which comprises:

an axle housing member including a cylindrically-shaped chamber mounted to said cell bottom closure;

a wheel axle including a housing shaft portion and a wheel shaft portion, the axis of said wheel shaft portion being parallel and offset from the axis of said housing shaft portion, said housing shaft portion being initially rotatable positionable within said cylindrically-shaped chamber of said axle housing member; and a wheel member rotatably mounted on said wheel shaft portion whereby rotation of said housing shaft portion within said cylindrically-shaped chamber of said axle housing member permits elevational adjustment of said wheel member with respect to said track.

2. The improved wheel housing assembly as defined in claim 1 wherein said wheel axle is formed with an annular groove for receiving a positioning element mounted on said axle housing member for positioning said housing shaft portion of said wheel axle within said axle housing member.

3. The improved wheel housing assembly as defined in claim 2 wherein said positioning element is a thread bolt engaged in a threaded orifice formed in said axle housing member.

4. The improved wheel housing assembly as defined in claim 1 wherein said axle housing member is provided with an orifice for receiving a shear pin after elevational adjustment of said wheel member with respect to said shaft.

5. The improved wheel housing assembly as defined in claim 1 wherein said wheel axle is formed with flat surfaces on a termination end of said wheel shaft portion.

6. The improved wheel housing assembly as defined in claim 1 wherein said housing shaft portion is of a larger diameter than said wheel shaft portion.

* * * * *